(12) United States Patent
Kitatani

(10) Patent No.: US 9,703,365 B2
(45) Date of Patent: Jul. 11, 2017

(54) DEVICE CAPABLE OF PRESENTING STARTUP UI, METHOD OF PRESENTING THE SAME, AND NON-TRANSITORY COMPUTER READABLE MEDIUM STORING PRESENTATION PROGRAM

(71) Applicant: NEC CASIO MOBILE COMMUNICATIONS, LTD., Kawasaki-shi, Kanagawa (JP)

(72) Inventor: Kenichi Kitatani, Kawasaki (JP)

(73) Assignee: NEC Corporation, Tokyo (JP)

( * ) Notice: Subject to any disclaimer, the term of this patent is extended or adjusted under 35 U.S.C. 154(b) by 206 days.

(21) Appl. No.: 14/381,225

(22) PCT Filed: Oct. 16, 2012

(86) PCT No.: PCT/JP2012/006618
§ 371 (c)(1),
(2) Date: Aug. 27, 2014

(87) PCT Pub. No.: WO2013/128510
PCT Pub. Date: Sep. 6, 2013

(65) Prior Publication Data
US 2015/0095683 A1    Apr. 2, 2015

(30) Foreign Application Priority Data
Mar. 2, 2012   (JP) ................................. 2012-046559

(51) Int. Cl.
*G06F 1/32* (2006.01)
*H04M 1/67* (2006.01)
(Continued)

(52) U.S. Cl.
CPC .......... *G06F 1/3296* (2013.01); *G06F 1/3231* (2013.01); *G06F 3/0481* (2013.01);
(Continued)

(58) Field of Classification Search
None
See application file for complete search history.

(56) References Cited

U.S. PATENT DOCUMENTS 8,417,297 B2 * 4/2013 Lee ...................... G06F 1/1616
455/550.1
8,571,521 B2   10/2013 Kim et al.
(Continued)

FOREIGN PATENT DOCUMENTS

EP   2421236    2/2012
JP   2002-123359   4/2002
(Continued)

OTHER PUBLICATIONS

Extended European Search Report dated Sep. 16, 2015; Application No. 12869736.4.
(Continued)

*Primary Examiner* — Fahmida Rahman
(74) *Attorney, Agent, or Firm* — Young & Thompson

(57) ABSTRACT

To provide a startup UI presentation portable device capable of automatically presenting a preset UI highly likely to be used next in the current posture when returned from a sleep mode, the portable device (1), when returned from the sleep mode (S1), determines whether the posture (S2) of the portable device (1) sent from a built-in acceleration sensor is within a specified range of a reference posture predetermined for each of a camera, a projector and a direction indicator (S3). When the posture is within the specified range (YES in S3), the portable device (1) displays a startup UI (icon) previously associated as a startup UI for a function most likely to be used in the reference posture on a display screen (S5). The display of the startup UI is performed automatically subsequent to release of the sleep mode, without requiring an unlock operation or password entry.

15 Claims, 5 Drawing Sheets

(51) Int. Cl.
*H04W 52/02* (2009.01)
*H04M 1/725* (2006.01)
*G06F 3/0481* (2013.01)

(52) U.S. Cl.
CPC ......... *H04M 1/67* (2013.01); *H04M 1/72522* (2013.01); *H04W 52/0254* (2013.01); *G06F 2200/1637* (2013.01); *H04M 2250/12* (2013.01); *H04M 2250/22* (2013.01); *H04M 2250/52* (2013.01); *H04M 2250/54* (2013.01); *H04W 52/027* (2013.01); *Y02B 60/1289* (2013.01); *Y02B 60/50* (2013.01)

(56) References Cited

U.S. PATENT DOCUMENTS

| | | | |
|---|---|---|---|
| 9,197,738 | B2 | 11/2015 | Peev et al. |
| 2008/0254822 | A1 | 10/2008 | Tilley |
| 2009/0221262 | A1* | 9/2009 | Miwa .................... G08B 25/016 455/404.1 |
| 2011/0084962 | A1 | 4/2011 | Kim et al. |
| 2011/0304648 | A1* | 12/2011 | Kim ...................... G06F 1/1626 345/633 |
| 2014/0007227 | A1* | 1/2014 | Morinaga ............... G06F 21/31 726/19 |

FOREIGN PATENT DOCUMENTS

| | | |
|---|---|---|
| JP | 2007-096707 | 4/2007 |
| JP | 2011-182072 | 9/2011 |
| WO | WO 2010/065752 | 6/2010 |

OTHER PUBLICATIONS

Japanese Office Action dated Mar. 1, 2016 in corresponding Japanese Patent Application No. 2014-501835 with English translation of Japanese Office Action.

Satoshi Tanaka, Shashin de Kaisetsu suru 'INFOBAR C01', [online], ITmedia, Jan. 17, 2012 (Jan. 17, 2012), Internet <http://www.itmedia.co.jp/mobile/articles/1201/17/news019.html> [retrieval date: Nov. 14, 2012 (Nov. 14, 2012)].

International Search Report—PCT/JP2012/006618—Nov. 27, 2012.

* cited by examiner

POSTURE AND FUNCTION CORRESPONDENCE TABLE

| POSTURE | FUNCTION |
|---|---|
| CAMERA LENS IS IN DIRECTION WITHIN ±15° FROM HORIZONTAL | CAMERA |
| PROJECTOR LENS IS IN DIRECTION WITHIN ±15° FROM HORIZONTAL | PROJECTOR |
| DISPLAY SCREEN IS TILTED WITHIN ±15° FROM HORIZONTAL | DIRECTION INDICATOR |

Fig. 4

| POSTURE | FUNCTION |
|---|---|
| CAMERA LENS IS IN DIRECTION WITHIN ±15° FROM HORIZONTAL | CAMERA, AR*1, LEVEL |
| PROJECTOR LENS IS IN DIRECTION WITHIN ±15° FROM HORIZONTAL | PROJECTOR |
| DISPLAY SCREEN IS TILTED WITHIN ±15° FROM HORIZONTAL | DIRECTION INDICATOR, NAVIGATION, MAP |
| DISPLAY SCREEN FACES DOWNWARD VERTICALLY WITHIN ±60° | PLANISPHERE |
| ... | ... |

*1: AUGMENTED REALITY

Fig. 5

DEVICE CAPABLE OF PRESENTING STARTUP UI, METHOD OF PRESENTING THE SAME, AND NON-TRANSITORY COMPUTER READABLE MEDIUM STORING PRESENTATION PROGRAM

TECHNICAL FIELD

The present invention relates to a device capable of presenting a startup UI (User Interface) on a display screen by a computer program and, particularly, relates to a device that has a sleep mode for power saving and presents a startup UI corresponding to a posture after restarting (returning) from the sleep mode, a startup UI presentation method, and a non-transitory computer readable medium storing a program executing the startup UI presentation method by a computer.

BACKGROUND ART

Many devices such as a mobile phone, a camera, a projector, a direction indicator, a PDA (Personal Digital Assistants) and a portable navigation system have a power saving mode such as a sleep mode in order to reduce power consumption of a CPU (Central Processing Unit) and a display unit (display) included therein.

In the sleep mode, working data stored in a memory during use is kept in the memory as it is, and the same working data is stored also in a hard disk. When a user does not access a device, such as by a screen touch or keyboard input, for a certain time or longer, or when a user performs an operation to enter the sleep mode, the device enters the sleep mode.

The sleep mode is released and the device returns to an operation mode by an access operation such as touching a display screen with a touch panel function, pressing a key on a keyboard, or moving a device body by a certain distance or more, or by performing an operation on a sleep mode release button. In many cases, the device is set so that, even after the sleep mode is released and the device returns to the operation mode, a command cannot be executed unless an operation is performed on an unlock button to release a lock for protection against accidental operation and further a password to release a security lock for ensuring security is entered.

A device having a lock/unlock switch for lock and unlock input can be preset so that, if the lock/unlock switch is set to the lock position, even when a certain command input operation is performed, the command is not input to the CPU. Setting the lock/unlock switch to the lock position and thereby setting the device to the locked state, i.e. enabling the operation of the lock/unlock switch, i.e. enabling the lock, can be made arbitrarily when the device is in a normal operation mode. Further, disabling the operation of the lock/unlock switch, i.e. disabling the lock, can be done arbitrarily when the device is in a normal operation mode.

When the lock is set to be enabled in the device, by setting the lock/unlock switch to the lock position and thereby setting the device to the locked state, the device's state is maintained even in the event of accidental operation not intended by a user. To enable input of a command by touching a display screen with a touch panel function or by pressing a keyboard key, the lock/unlock switch is set to the unlock position. If the device lock is enabled, even in the state where the sleep mode is released and the device returns to an operation mode, the next operation such as entering a password cannot be performed unless the device lock is released by performing an operation on the unlock button.

Without entering a password, the device cannot input the next command (for example, input of a key indicating display of a startup UI for a camera function). In many cases, the device is set to accept input of the next command only when a password is entered in order to prevent theft of personal information or data or tampering with data due to unauthorized use of the device by a malicious third party.

A device has functions that are used in a specific posture, such as a camera, a projector and a direction indicator. For example, the camera function is used with the display screen positioned perpendicularly, and the projector function and the direction indicator function are used with the display screen positioned horizontally in many cases. In a camera on which a lens is mounted with the optical axis perpendicular to the display screen, the display screen needs to be positioned perpendicularly in order to direct the optical axis to a subject such as a person on the ground. Further, in a projector on which a lens is mounted with the optical axis along the longitudinal direction of its body (in parallel with the display screen), the display screen needs to be positioned horizontally in order to project an image or the like on a screen that is suspended perpendicularly to the ground. In this manner, the device posture and the function to be used correspond to each other. Further, in the example of a direction indicator, the bearing of the direction indicated by a specified axis such as the longitudinal axis of the device is accurately displayed on the display screen when the display screen is positioned horizontally, and therefore the device posture and the function to be used (the direction indicator function in this example) correspond to each other as well.

In view of the above, if a device has a posture detection function and, when the posture detection function detects a specific posture or continues to detect the posture for a specified time, a UI corresponding to the posture is automatically presented (which is synonymous with "displayed") on the display screen, there is no need to input a special operation to display the UI and therefore the device operation becomes quick and convenient.

A device that has a posture detection function and, when a specific posture is detected or continues for a specified time, presents a UI for a specific function associated with the specific posture, is disclosed mainly in Paragraphs 0035 to 0043 in the specification and FIGS. 4 and 5 of Patent Literature 1 (Japanese Unexamined Patent Application Publication No. 2011-182072) as the invention titled "PORTABLE TERMINAL AND RESTORATION CONTROL METHOD FROM DISPLAY POWER SAVING STATE FOR THE SAME". In the portable terminal according to Patent Literature 1, the posture detection function is implemented by an acceleration sensor.

In the portable terminal according to Patent Literature 1, the acceleration sensor detects a still state, and if the acceleration sensor detects a certain amount of movement (for example, 10 cm) when the portable terminal is in the display power saving state (display OFF), a release trigger of the display power saving state is generated (the still state (1) in FIG. 4) to release the display power saving state. After the display power saving state is released, when the acceleration sensor detects a still state within a specified time (for example, 2 seconds) with the hinge part at an upper position, an incoming email list is displayed (the still state (2) in FIG. 4), when the acceleration sensor detects a still state within a specified time with the hinge part at a lower position, an outgoing and incoming call list is displayed (the still state (3) in FIG. 4), when the acceleration sensor detects a still state within a specified time with the hinge part at a right position, a camera preview is displayed (the still state (4) in FIG. 4), and when the acceleration sensor detects a still state within a specified time with the hinge part at a left position, a TV screen is displayed (the still state (5) in FIG. 4).

CITATION LIST

Patent Literature

Japanese Unexamined Patent Application Publication No. 2011-182072 (Paragraphs 0035-0043 and FIGS. 4 and 5)

SUMMARY OF INVENTION

Technical Problem

In the portable terminal according to Patent Literature 1 described above, the incoming email list, the outgoing and incoming call list, the camera preview and the TV screen are displayed according to the posture of the portable terminal detected by the acceleration sensor. This function in the portable terminal according to Patent Literature 1 is implemented using the posture of the hinge part as a command input means for display switching that is required following the release of the display power saving state.

As described above, because the portable terminal according to Patent Literature 1 merely uses the posture of the hinge part as a display switching command input means that is required following the release of the display power saving state, a UI that is irrelevant to a UI likely to be required next when the hinge part is in a certain posture is presented on the display unit. For example, although it is described that a camera preview is displayed when the acceleration sensor detects a still state within a specified time with the hinge part at a right position (the still state (4) in FIG. 4), it is unknown which direction the camera lens is facing when the hinge part is at the right position, and no consideration is made to presentation of an appropriate UI that is likely to be used in that posture according to the posture of the portable terminal. Thus, although a UI that is predetermined according to the posture is displayed on the display screen, a UI that is likely to be used in a certain posture is not displayed, and therefore there is no effect of reducing the number of operations required for work to be performed by a user after releasing the display power saving state, and thus there is no much effect of improving user-friendliness.

Further, many devices require an operation to release a lock or enter a password before enabling input of a command (for example, an instruction to display a camera startup UI on a display screen) even when the power saving mode such as the sleep mode is released and the device returns to the normal state. Input of a command is performed by, for example, touching a display screen having a touch panel function with a finger. If the portable terminal according to Patent Literature 1 requires performance of an unlock operation or a password entry operation, the portable terminal can input a command only after the unlock operation or the password entry operation is performed. Thus, the portable terminal according to Patent Literature 1 requires a further operation to input a command for startup UI presentation even when the power saving mode such as the sleep mode is released and the portable terminal returns to the normal state (the state to which it returns from the power saving state).

In view of the foregoing, an exemplary object of the present invention is to provide a device that can automatically present a startup UI for starting a specified function associated with a posture when a power saving mode is returned from, a startup UI presentation method, and a startup UI presentation program.

Solution to Problem

To solve the above problem, a device, a startup UI presentation method and a non-transitory computer readable medium storing a startup UI presentation program according to an exemplary aspect of the present invention have the following configuration.

(1) A device according to one exemplary aspect of the present invention is a device having a power saving mode, including a power saving mode return detection unit that detects a return from a power saving mode, a posture detection unit that detects a posture of the device, and a user interface presentation unit that, when a posture detected by the posture detection unit after the power saving mode return detection unit detects a return from the power saving mode is a posture within a specified range, presents a startup user interface for starting a specified function associated with the posture within the specified range.

(2) A startup UI presentation method according to one exemplary aspect of the present invention detects a return from a power saving mode by a power saving mode return detection unit, detects a posture after the power saving mode return detection unit detects a return from the power saving mode by a posture detection unit, and when the posture detection unit detects a posture within a specified range, presents a user interface for starting a specified function associated with the posture within the specified range by a user interface presentation unit.

(3) A non-transitory computer readable medium storing a startup UI presentation program according to one exemplary aspect of the present invention causes a computer to execute the above method (2).

Advantageous Effects of Invention

A device, a startup UI presentation method and a startup UI presentation program according to an exemplary aspect of the present invention can automatically present a startup UI for starting a specified function associated with a posture when a power saving mode is returned from.

BRIEF DESCRIPTION OF DRAWINGS

FIG. 4 is a posture and function correspondence table representing a relationship between a posture of the startup UI presentation portable device shown in FIG. 1 and a function corresponding to the posture in a tabular form.

FIG. 5 is a table showing a relationship between a posture of a portable device according to an exemplary embodiment of the invention and a function corresponding to the posture for various examples in a tabular form.

DESCRIPTION OF EMBODIMENTS

A device and a method of presenting a startup UI according to a preferred exemplary embodiment of the present invention are described hereinafter with reference to the attached drawings. Although a device according to one exemplary embodiment of the invention is described as a portable device having a mobile phone function, the device according to the invention does not necessarily have a communication function, and a device according to the present invention may be a device not having a communication function, as long as it has a power saving mode as a wait mode for lower power consumption, such as a sleep mode, and includes a posture detection means, where a function likely to be used is associated with a posture detected by the posture detection means. Accordingly, the device according to the present invention may be a camera, a projector, a direction indicator, a PDA (Personal Digital Assistants), a PC (Personal Computer), a smartphone terminal, a PHS (Personal Handy-Phone System), a tablet terminal, a music player terminal, or a portable device having a variety of functions such as an augmented reality function, a level function, a navigation function, a map display function and a planisphere function, in addition to a mobile phone. Further, as described later, the present invention may also be applied to a device not called a portable device. Note that, although a preferred exemplary embodiment of a device and a method of presenting a startup UI according to the present invention is described hereinbelow, the startup UI presentation method can be implemented as a computer program.

Figure 1:
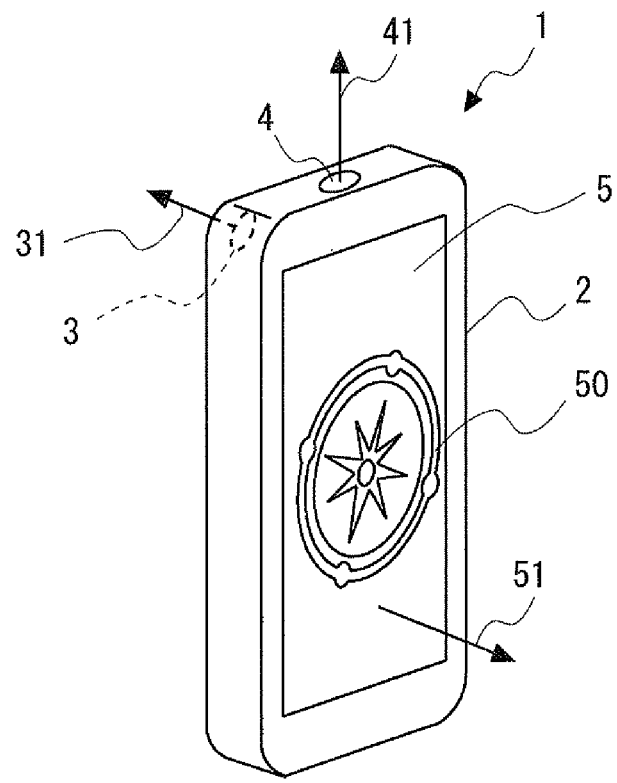
FIG. 1 is a perspective view showing an appearance of a startup UI presentation portable device according to one exemplary embodiment of the invention.

FIG. 1 is a perspective view showing an appearance of a portable device according to one exemplary embodiment of the invention. A portable device 1 according to this exemplary embodiment has a display screen 5 on the front side of a device body 2 and includes electronic circuits such as a CPU and a memory, a transmitting and receiving circuit for a mobile phone function, an antenna for a mobile phone function, an optical system for implementing a camera function, an optical system for implementing a projector function, a GPS device for implementing a direction indicator, an acceleration sensor that detects a posture of the device body 2, a display unit (display), a power supply for all electronic circuits and a battery for lighting of a display unit and the like. Each electronic circuit in the portable device 1 is controlled by a computer program that is stored in a hard disk, read from the hard disk to the memory, and operates on the CPU, to implement a mobile phone function, a camera function, a projector function, a direction indicator function and the like. The computer program and hardware to execute the computer program serve as a control unit of the portable device. Further, a power ON/OFF switch, a sleep mode enter/release switch, a lock/unlock switch, and a silent mode switch for mobile phone beeping ON/OFF are mounted on the side surface of the device body 2, though not shown.

As shown in FIG. 1, the portable device 1 has a camera lens 3 as an aperture lens of a camera optical system. The camera lens 3 has an aperture on the backside (back surface) of the device body 2, and its optical axis 31 is perpendicular to the display screen 5. Further, the portable device 1 has a projector lens 4 as an aperture lens of a projector optical system. The projector lens 4 has an aperture on the end surface (top surface) in the longitudinal direction of the device body 2, and its optical axis 41 is along the longitudinal direction of the device body 2 and parallel with the display screen 5.

The display screen 5 in the portable device 1 of FIG. 1 is a display surface of a display unit, which is a liquid crystal display device, and has a touch panel function. A user can input a command to a control unit by touching a button or a keyboard displayed on the display screen 5 by the control unit with a finger.

The portable device 1 of FIG. 1 has a sleep mode, which is one type of a power saving mode. As described earlier, working data stored in a memory during use is kept in the memory as it is, and the same working data is also stored in a hard disk in the sleep mode. When a user does not access the portable device 1, such as command or data input by touching the display screen 5, for a certain time (for example, 10 minutes) or longer, or when a user performs an operation to set the sleep mode enter/release switch to the sleep mode enter position, the portable device 1 enters the sleep mode.

The sleep mode is released and the portable device 1 returns to an operation mode by an access operation such as touching the display screen 5 or setting the sleep mode enter/release switch to the sleep mode release position in the portable device 1 during the sleep mode.

The acceleration sensor that is included in the device body 2 of the portable device 1 always detects the posture of the portable device 1 (which is the same as the posture of the device body 2) along the three orthogonal axes after the sleep mode is released. When released from the sleep mode, the control unit of the portable device 1 determines whether the posture of the portable device 1 sent from the acceleration sensor is within a specified range of a reference posture predetermined for each of a camera, a projector, a direction indicator and the like, and if the posture is within the specified range, displays the startup UI that is associated with the posture as a startup UI for a function most likely to be used in the reference posture on the display screen. In this exemplary embodiment, the display (presentation) of the startup UI is automatically performed by the control unit after the release of the sleep mode without the need for the lock release and password entry. The operation of the portable device 1 according to the exemplary embodiment in FIG. 1 is more specifically described below.

Figure 2:
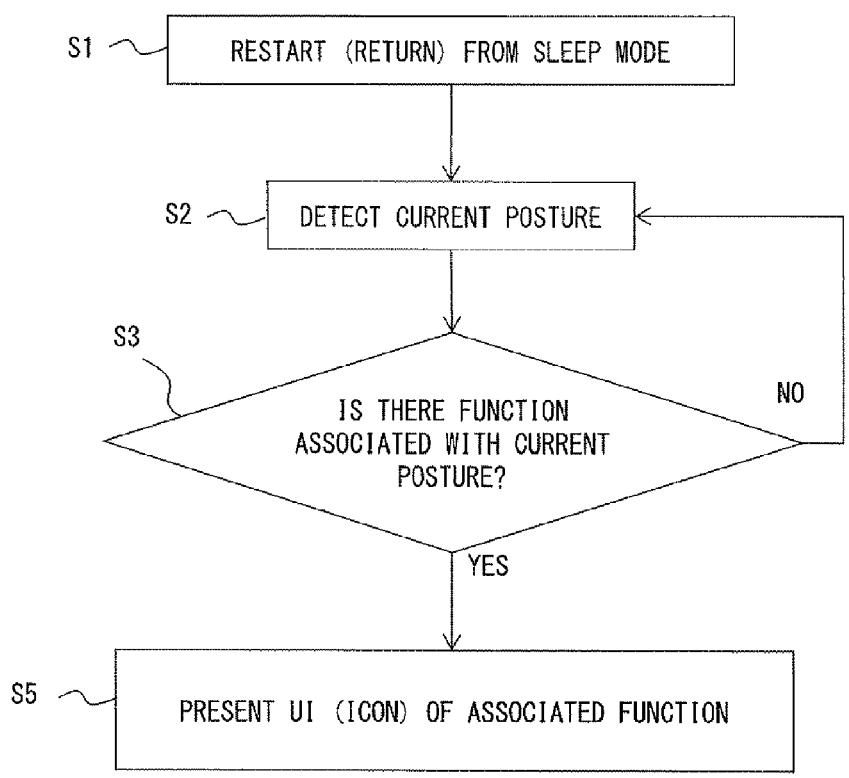
FIG. 2 is a flowchart showing an operation in the startup UI presentation portable device shown in FIG. 1.

FIG. 2 is a flowchart showing the operation of the portable device 1 shown in FIG. 1. When the portable device 1 is in the sleep mode, if the sleep mode is released and the portable device 1 is restarted by an access operation such as touching the display screen 5 or setting the sleep mode enter/release switch to the sleep mode release position (Step S1), the control unit of the portable device 1 detects the posture of the portable device 1 output from the acceleration sensor (Step S2), and determines whether the detected posture belongs to any of the posture ranges shown in the posture list of FIG. 4 (Step S3), and when the posture determination result is YES, a startup UI for the function corresponding to the posture is displayed on the display screen (Step S5). The reference posture for a camera is a posture in which the optical axis of the camera lens is horizontal. The reference posture for a projector is a posture in which the optical axis of the projector lens is horizontal. The reference posture for a direction indicator is a posture in which the display screen 5 is horizontal (a posture in which "the axis 1 perpendicular to the display screen" in FIG. 1 is vertical).

The portable device 1 shown in FIG. 1 has a camera function, a projector function and a direction indicator function as the functions related to the posture. The camera function is often used with the optical axis 31 of the camera lens 3 in the direction within ±15 degrees from the horizontal. Thus, the camera function is associated with the posture of the portable device 1 when the optical axis 31 of the camera lens 3 is in the direction within ±15 degrees from the horizontal. The projector function is often used with the optical axis 41 of the projector lens 4 in the direction within ±15 degrees from the horizontal. Thus, the projector function is associated with the posture of the portable device 1 when the optical axis 41 of the projector lens 4 is in the direction within ±15 degrees from the horizontal. Further, the direction indicator function is often used with the display screen 5 tilted within ±15 degrees with respect to the horizontal plane. Thus, the direction indicator function is associated with the posture of the portable device 1 when the display screen 5 is tilted within ±15 degrees with respect to the horizontal plane. FIG. 4 shows a posture and function correspondence table representing a relationship between a posture of the portable device 1 shown in FIG. 1 and a function that is stored in a storage area of the control unit in association with the posture as a function that is most likely to be used in the posture of the portable device 1.

As shown in FIG. 4, when the sleep mode is released and the portable device 1 is restarted, if the portable device 1 is in such a posture that the optical axis 31 of the camera lens 3 is in the direction within ±15 degrees from the horizontal, a camera startup UI is displayed on the display screen 5 of the portable device 1. Likewise, when the sleep mode is released and the portable device 1 is restarted, if the portable device 1 is in such a posture that the optical axis 41 of the projector lens 4 is in the direction within ±15 degrees from the horizontal, a projector startup UI is displayed on the display screen 5 of the portable device 1. Further, when the sleep mode is released and the portable device 1 is restarted, if the portable device 1 is in such a posture that the display screen 5 is tilted within ±15 degrees with respect to the horizontal plane, a direction indicator startup UI is displayed on the display screen 5 of the portable device 1. FIG. 1 illustrates a direction indicator startup UI as the display image 50 of a direction indicator application.

As shown in the perspective view of FIG. 1 showing the device appearance, in the exemplary embodiment shown in FIG. 1, the portable device 1 is often placed on a level surface such as on a desk in order to set the posture of the device body 2 so that the optical axis 41 of the projector lens 4 is horizontal. Because the display screen 5 is parallel with the level surface, a direction indicator can be used as well. In other words, in the posture where the display screen 5 is parallel with the level surface, both the projector function and the direction indicator function can be used in a suitable manner. Thus, in this exemplary embodiment, both the projector startup UI and the direction indicator startup UI are presented on the display screen 5 when the sleep mode is released in order that a user can select and start one of those functions. Because the startup UI is an icon in this exemplary embodiment, it is easy to present both the projector startup UI and the direction indicator startup UI on the display screen 5. A user can select one startup UI to use by touching it and thereby execute the function related to the selected UI.

Figure 3:
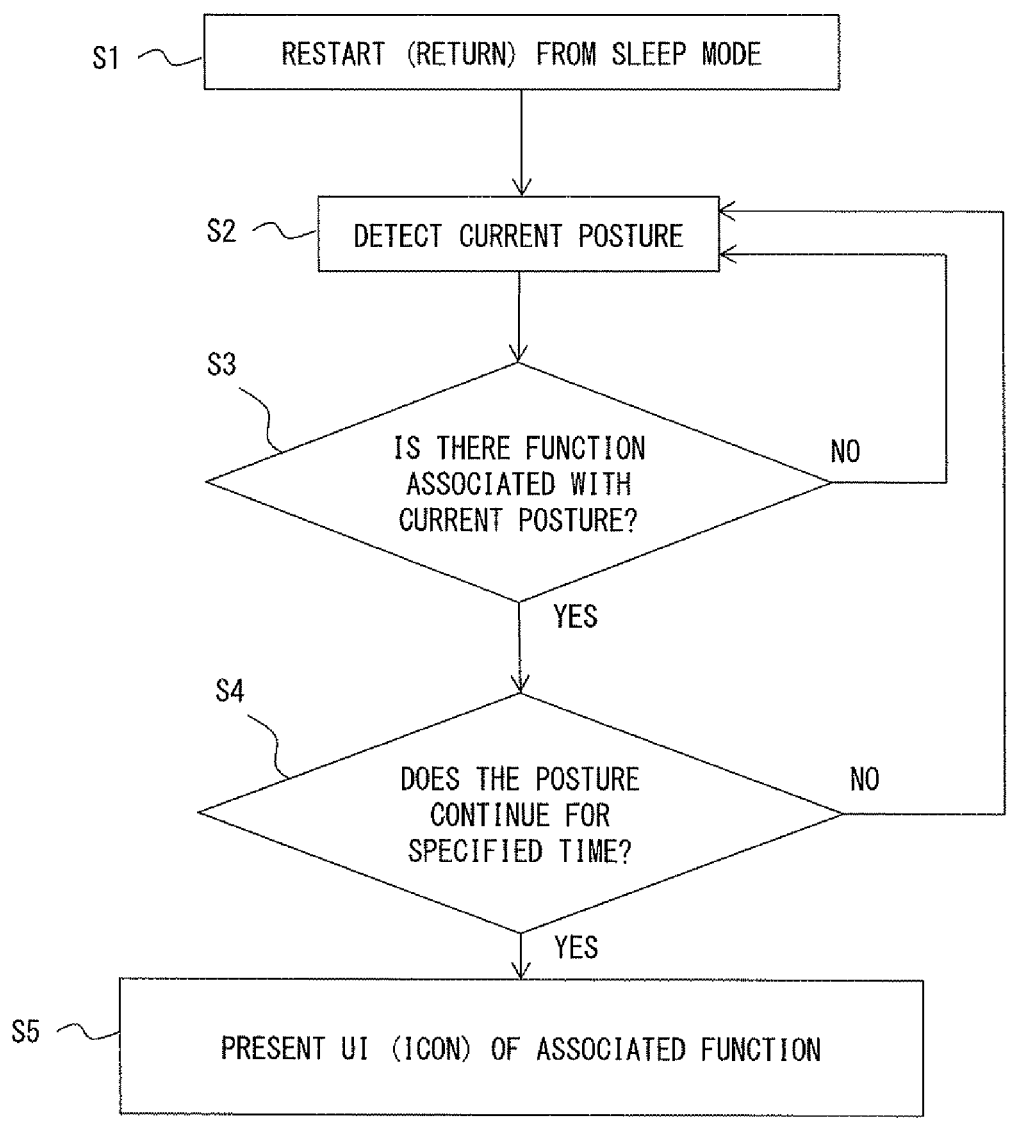
FIG. 3 is a flowchart showing an operation in a modified example of the startup UI presentation portable device shown in FIG. 1.

FIG. 3 is a flowchart showing an operation of one modified example of the exemplary embodiment shown in FIG. 1. In the modified example of FIG. 3, Step S4 is added between Steps S3 and S5 of the exemplary embodiment shown in FIG. 2. In Step S4, when it is determined in Step S3 that there is a function that is associated with the posture of the portable device 1 when the sleep mode is released (YES), it is determined whether the posture continues for a specified time (for example, 2 seconds) or more, and when the posture continues for the specified time or more (YES), the process proceeds to Step S5, and the startup UI for the function associated with the posture is displayed on the display screen 5, and when the posture does not continue for the specified time or more (NO), the process returns to Step S2. With use of the portable device according to the modified example in FIG. 3, it is possible to more reliably display the startup UI for the function intended by a user on the display screen compared with the portable device according to the exemplary embodiment shown in FIG. 2.

In addition to the exemplary embodiments shown in the flowcharts of FIGS. 2 and 3, this exemplary embodiment can also be implemented as the following modified examples (1) to (5).

(1) When a specified posture continues for a specified time T1 (for example, T1=2 seconds) within a specified period T0 (for example, T0=1 minute) from the release of the sleep mode, a startup UI for the function corresponding to the posture is presented.

(2) Step S6 is added after Step 5 of FIG. 2 or 3, and it is determined whether a posture within a specified angle is maintained for a period of a specified time or more, and when the posture within the specified angle is maintained after presenting the startup UI in Step S5, the startup UI remains presented, and when the posture within the specified angle is not maintained, the startup UI is not displayed.

(3) Further, in the exemplary embodiment shown in FIG. 2, the posture of the portable device is detected in Step S2, and when it is determined in Step S3 that there is a function that is associated with the posture (YES), a UI for the function associated with the posture is presented in Step S5. In addition to this, the UI presented in Step S5 may remain presented even when the posture of the portable device changes and becomes outside the range of the posture corresponding to the UI after the determination in Step S3 results in YES.

Likewise, in the exemplary embodiment shown in FIG. 3, processing of Steps S2 and S3 is performed in the same manner as in FIG. 2, and when it is determined in Step S4 that the posture associated with a specified function continues for a specified time (YES), a UI for the function associated with the posture is presented in Step S5. In addition to this, the UI presented in Step S5 may remain presented even when the posture of the portable device changes and becomes outside the range of the posture corresponding to the UI after the determination in Step S4.

(4) In the exemplary embodiments of FIGS. 2 and 3 and the above modified examples (1) and (2), the display of the startup UI is automatically performed by the control unit following the release of the sleep mode without the need for the lock release and password entry. In these exemplary embodiments, a password verification UI may be displayed following the display of the startup UI.

(5) In the exemplary embodiment of FIG. 2, the posture of the portable device is detected in Step S2, and when it is determined in Step S3 that there is a function that is associated with the posture (YES), a UI for the function associated with the posture is presented in Step S5. Further, in the exemplary embodiment shown in FIG. 3, processing of Steps S2 and S3 is performed in the same manner as in FIG. 2, and it is determined in Step S4 whether the posture continues for a specified time (YES) or not (NO), and when the posture continues for the specified time (YES), a UI for the function associated with the posture is presented in Step S5. Those exemplary embodiments of FIGS. 2 and 3 may be modified, and the function associated with the posture may be displayed in Step S5 instead of the UI associated with the posture. The function displayed is the camera function, the projector function, the direction indicator function or the like. For example, when the camera function is displayed, an object within the viewing field of the camera lens 3 is displayed on the display screen 5.

In the exemplary embodiments described above with reference to FIGS. 1 to 4, the portable device has the camera, projector and direction indicator functions as shown in the function list of the posture and function corresponding table of FIG. 4. The present invention may also be applied to the portable device that has the functions shown in the tabular form in FIG. 5, in addition to the above functions, as an example of a case where it is possible to present a startup UI associated with the posture of the device body. As shown in the function list of FIG. 5, the present invention is applicable to the portable device having various posture-related functions such as an AR (Augmented Reality), a level, a navigation, a map and a planisphere, in addition to the camera, projector and direction indicator functions.

In the portable device according to related art described earlier, even after the sleep mode is released and the device returns to the operation mode, a command cannot be executed unless the lock/unlock button to the unlock position is set and a password is entered. On the other hand, in the exemplary embodiment of the invention described above, the startup UI for the function that is most likely to be used in the posture when the sleep mode is released is displayed on the display screen without the need for an unlock operation or password entry, and therefore a user can execute a desired function quickly with a simple operation.

Exemplary embodiments of the present invention have been described above. However, those exemplary embodiments are by way of illustration only, and the invention is not limited to these exemplary embodiments. It will be understood by those of ordinary skill in the art that various changes in form and details may be made therein without departing from the spirit and scope of the present invention. For example, although the portable device having the sleep mode as a power saving mode is illustrated in the above-described exemplary embodiment, the present invention is not limited to the sleep mode, and is also applicable to the portable device having a power saving mode referred to by various terms such as standby, suspend or rest. Further, although an icon is used as an example of the startup UI in the above-described exemplary embodiment, the present invention may instead be implemented using a so-called widget or gadget.

Further, although the portable device having the mobile phone function is illustrated in the above-described exemplary embodiment, the present invention is not limited to the portable terminal, and may also be applied to any device having a function corresponding to a posture. A device to which the present invention is applicable includes a camera with a direction indicator for ceiling suspension that is held by a suspension holding member allowing a change in posture, for example, though it is not a portable device. Further, the present invention may also be applied to a device that is placed on a desk or in a vehicle and that is held by a support member allowing a change in posture. Further, the present invention may be applied also to a device to be mounted on a moving body that changes in posture during operation, such as an aircraft, since the device posture varies according to the posture of the moving body.

Further, although the UI is presented by being displayed on the display screen 5 in the above-described exemplary embodiment, the UI may not be limited to screen display, and the UI may instead be presented using an audio message. An example of the audio UI is an operation guide message.

Although the present invention is described as a hardware configuration in the above exemplary embodiments, the present invention is not limited thereto. The present invention may be implemented by causing a CPU (Central Processing Unit) to execute a computer program to perform processing of the mobility management device, the switching device or the SGSN. The above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-046559, filed on Mar. 2, 2012, the disclosure of which is incorporated herein in its entirety by reference.

REFERENCE SIGNS LIST

1 PORTABLE DEVICE
2 DEVICE BODY
3 CAMERA LENS
4 PROJECTOR LENS
31 OPTICAL AXIS OF CAMERA LENS
41 OPTICAL AXIS OF PROJECTOR LENS
50 DISPLAY IMAGE OF DIRECTION INDICATOR APPLICATION
51 AXIS PERPENDICULAR TO DISPLAY SCREEN

The invention claimed is:
1. A device comprising:
a power saving mode return detection unit that detects a return from a power saving mode;
a posture detection unit that detects a posture of the device; and
a user interface presentation unit that, when a posture detected by the posture detection unit after the power saving mode return detection unit detects a return from the power saving mode is a posture within a specified range that is set based on a direction of a component used for a specified function, presents a startup user interface for starting the specified function, wherein
if the device is in such a posture that a direction of an optical axis of a camera lens is in the direction within first predetermined degrees from a horizontal, the user interface presentation unit presents a camera startup user interface for starting a camera function, if the device is in such a posture that the direction of an optical axis of a projector lens is in the direction within second predetermined degrees from the horizontal, the user interface presentation unit presents a projector startup user interface for starting a projector function, and if the device is in such a posture that the direction of a display screen is in the direction within third predetermined degrees from the horizontal, the user interface presentation unit presents a direction indicator startup user interface for starting a direction indicator function.

2. The device according to claim 1, further comprising:

a lock setting unit that sets at least one of a locked state for preventing accidental operation and a security locked state for ensuring security, wherein when the posture detection unit detects the posture within the specified range, the user interface presentation unit presents the startup user interface regardless of setting set by the lock setting unit.

3. The device according to claim 1, wherein when the posture detection unit detects the posture within the specified range for a specified time, the user interface presentation unit presents the startup user interface.

4. The device according to claim 2, wherein the user interface presentation unit presents a user interface for releasing the security locked state after detecting a selection of the specified function by a user using the startup user interface.

5. The device according to claim 2, wherein when the posture detection unit detects the posture within the specified range for a specified time, the user interface presentation unit presents the startup user interface.

6. The device according to claim 3, wherein the user interface presentation unit presents a user interface for releasing a security locked state after detecting a selection of the specified function by a user using the startup user interface.

7. The device according to claim 5, wherein the user interface presentation unit presents a user interface for releasing the security locked state after detecting a selection of the specified function by a user using the startup user interface.

8. A startup user interface presentation method comprising:

detecting a return of a device from a power saving mode by a power saving mode return detection unit in the device;

detecting a posture after the power saving mode return detection unit detects the return from the power saving mode by a posture detection unit in the device; and when the posture detection unit detects a posture within a specified range that is set based on a direction of a component used for a specified function, presenting a user interface for starting the specified function by a user interface presentation unit, wherein if a direction of an optical axis of a camera lens is in the direction within first predetermined degrees from a horizontal, the user interface presentation unit presents a camera startup user interface for starting a camera function, if the direction of an optical axis of a projector lens is in the direction within second predetermined degrees from the horizontal, the user interface presentation unit presents a projector startup user interface for starting a projector function, and if the direction of a display screen is in the direction within third predetermined degrees from the horizontal, the user interface presentation unit presents a direction indicator startup user interface for starting a direction indicator function.

9. A non-transitory computer readable medium storing a startup user interface presentation program for executing the method according to claim 8 as a program executable by a computer.

10. The startup user interface presentation method according to claim 8, wherein the method is applied to a device where at least one of a locked state for preventing accidental operation and a security locked state for ensuring security can be set by a lock setting unit, and when the posture detection unit detects the posture within the specified range, presenting, by the user interface presentation unit, the startup user interface regardless of setting set by the lock setting unit.

11. The startup user interface presentation method according to claim 10, wherein presenting, by the user interface presentation unit, a user interface for releasing the security locked state after detecting a selection of the specified function by a user using the startup user interface.

12. The startup user interface presentation method according to claim 10, wherein when the posture detection unit detects the posture within the specified range for a specified time, presenting the startup user interface by the user interface presentation unit.

13. The startup user interface presentation method according to claim 12, wherein presenting, by the user interface presentation unit, a user interface for releasing the security locked state after detecting a selection of the specified function by a user using the startup user interface.

14. The startup user interface presentation method according to claim 8, wherein when the posture detection unit detects the posture within the specified range for a specified time, presenting the startup user interface by the user interface presentation unit.

15. The startup user interface presentation method according to claim 14, wherein presenting, by the user interface presentation unit, a user interface for releasing a security locked state after detecting a selection of the specified function by a user using the startup user interface.

* * * * *